US010047757B2

(12) United States Patent
Srivastava et al.

(10) Patent No.: US 10,047,757 B2
(45) Date of Patent: Aug. 14, 2018

(54) PREDICTING A SURGE EVENT IN A COMPRESSOR OF A TURBOMACHINE

(71) Applicant: General Electric Company, Schenectady, NY (US)

(72) Inventors: Sachin Srivastava, Bangalore (IN); Alexander James Pistner, Atlanta, GA (US); Raghavan Varadhan, Bangalore (IN); Matthew Everett Moore, Atlanta, GA (US)

(73) Assignee: General Electric Company, Schenectady, NY (US)

(*) Notice: Subject to any disclaimer, the term of this patent is extended or adjusted under 35 U.S.C. 154(b) by 234 days.

(21) Appl. No.: 15/189,776

(22) Filed: Jun. 22, 2016

(65) Prior Publication Data

US 2017/0370368 A1 Dec. 28, 2017

(51) Int. Cl.
*G01M 15/14* (2006.01)
*F04D 27/00* (2006.01)

(52) U.S. Cl.
CPC ........ *F04D 27/001* (2013.01); *F05D 2220/32* (2013.01); *F05D 2260/83* (2013.01)

(58) Field of Classification Search
USPC ................ 73/112.01, 112.03, 112.05, 112.06
See application file for complete search history.

(56) References Cited

U.S. PATENT DOCUMENTS

| | | |
|---|---|---|
| 2,974,483 A | 3/1961 | Sanders |
| 3,080,712 A | 3/1963 | Wood |
| 3,555,844 A | 1/1971 | Fleckenstein et al. |
| 3,868,625 A | 2/1975 | Speigner et al. |

(Continued)

FOREIGN PATENT DOCUMENTS

| | | |
|---|---|---|
| EP | 0839285 B1 | 7/2001 |
| EP | 2685067 A1 | 1/2014 |

(Continued)

OTHER PUBLICATIONS

Extended European Search Report and Opinion issued in connection with corresponding EP Application No. 7176923.5 dated Nov. 15, 2017.

*Primary Examiner* — Eric S McCall
(74) *Attorney, Agent, or Firm* — Eversheds-Sutherland (US) LLP

(57) ABSTRACT

Systems and methods for predicting a surge event in a compressor of a turbomachine are provided. According to one embodiment of the disclosure, a system may include one or more computer processors associated with the turbomachine. The one or more computer processors may be operable to receive a plurality of performance parameters of the compressor and analyze the plurality of performance parameters to determine corrected performance values of the performance parameters. Based at least partially on the corrected performance values, a compressor efficiency may be determined. The processor may be further operable to standardize the compressor efficiency for a standard mode of operation, ascertain historical performance data associated with the standard mode of operation, and analyze the compressor efficiency based at least partially on the historical performance data. Based on the analysis of the compressor efficiency, a surge event may be selectively predicted.

20 Claims, 10 Drawing Sheets

(56) References Cited

U.S. PATENT DOCUMENTS

| | | | | |
|---|---|---|---|---|
| 4,137,710 | A | 2/1979 | Preti et al. | |
| 4,363,596 | A | 12/1982 | Watson et al. | |
| 4,449,358 | A | 5/1984 | Mani | |
| 4,627,234 | A | 12/1986 | Schuh | |
| 4,662,817 | A | 5/1987 | Clark et al. | |
| 4,809,497 | A | 3/1989 | Shcuh | |
| 5,051,918 | A | 9/1991 | Parsons | |
| 5,385,012 | A | 1/1995 | Rowe | |
| 5,915,917 | A | 6/1999 | Eveker et al. | |
| 6,354,806 | B1 | 3/2002 | Bingham, Jr. | |
| 6,364,602 | B1 | 4/2002 | Andrew et al. | |
| 6,532,433 | B2 * | 3/2003 | Bharadwaj | F04D 27/02 416/26 |
| 6,584,434 | B1 | 6/2003 | Schick et al. | |
| 6,823,254 | B2 | 11/2004 | Faymon et al. | |
| 7,003,426 | B2 * | 2/2006 | Bonanni | F04D 27/001 415/1 |
| 7,596,953 | B2 | 10/2009 | Krok et al. | |
| 7,841,825 | B2 | 11/2010 | Chen et al. | |
| 8,185,291 | B2 * | 5/2012 | Nakakita | F01D 17/08 701/100 |
| 8,302,405 | B2 | 11/2012 | Price et al. | |
| 8,322,145 | B2 | 12/2012 | Snider et al. | |
| 2002/0161550 | A1 * | 10/2002 | Bharadwaj | F04D 27/02 702/182 |
| 2004/0068387 | A1 * | 4/2004 | Bonanni | F04D 27/001 702/138 |
| 2004/0193355 | A1 | 9/2004 | Faymon et al. | |
| 2010/0011846 | A1 * | 1/2010 | Krok | F01D 17/08 73/112.06 |
| 2010/0296914 | A1 * | 11/2010 | Staroselsky | F04D 27/001 415/47 |
| 2011/0094220 | A1 * | 4/2011 | Geyer | F02B 37/16 60/602 |
| 2012/0137759 | A1 * | 6/2012 | Krok | F04D 27/008 73/112.05 |
| 2014/0013765 | A1 | 1/2014 | Studerus et al. | |
| 2014/0047911 | A1 * | 2/2014 | Repetto | G01M 15/14 73/112.05 |
| 2014/0069105 | A1 | 3/2014 | Hoang | |
| 2016/0123175 | A1 | 5/2016 | Mazzaro | |
| 2017/0097006 | A1 * | 4/2017 | Hossain | F04D 27/0246 |

FOREIGN PATENT DOCUMENTS

| | | | |
|---|---|---|---|
| EP | 2 977 616 | A1 | 1/2016 |
| WO | 1997000381 | A1 | 1/1997 |
| WO | 2013/045540 | A2 | 4/2013 |

* cited by examiner

PREDICTING A SURGE EVENT IN A COMPRESSOR OF A TURBOMACHINE

TECHNICAL FIELD

This disclosure relates generally to turbomachines, and, more particularly, to systems and methods for predicting a surge event in a compressor of a turbomachine.

BACKGROUND

Turbomachines can be utilized in a variety of applications often requiring operation of a compressor at a relatively high pressure ratio to achieve a higher efficiency. Such operation of the turbomachine can lead to a surge event in the compressor, a condition associated with a disruption of a flow through the compressor. The possibility of a surge event in the compressor can increase due to various reasons, including accumulation of dirt in the compressor, grid fluctuations, and so forth. A surge event can result in a decreased performance of the compressor. Furthermore, a surge event can result in continuous pressure oscillations in the compressor or even cause accelerated turbomachine wear and possible damage to the turbomachine.

Some existing turbomachines can use local sensors and a local controller to monitor the airflow and pressure rise through the compressor in order to detect surge events in its early stages. However, the additional costs associated with local controllers and sensors for a fleet of turbine engines can be prohibitive. Furthermore, the cost of the sensors and the installation of these on a fleet of turbines can make it prohibitively expensive to retrofit existing turbomachines that have no existing surge detection systems.

Some existing solutions can attempt remote detection of a surge event using preinstalled sensors. However, while this approach can be used to determine a surge event at its early stage and diminish its event, it cannot be used to completely prevent the surge event or avoid a flow reversal in the compressor.

BRIEF DESCRIPTION OF THE DISCLOSURE

The disclosure relates to systems and methods for predicting a surge event in a compressor of a turbomachine. According to certain embodiments of the disclosure, a system is provided. The system can include one or more computer processors associated with a turbomachine. The computer processors can be operable to receive a plurality of performance parameters of a compressor. Upon receipt of the plurality of performance parameters, the one or more computer processors can be operable to analyze the plurality of performance parameters to determine corrected performance values of the plurality of performance parameters. Based at least partially on the corrected performance values, a compressor efficiency can be determined by the one or more computer processors. The one or more computer processors can be further operable to standardize the compressor efficiency for a standard mode of operation. Historical performance data associated with the standard mode of operation can be ascertained and the compressor efficiency may be analyzed by the one or more computer processors based, at least partially, on the historical performance data. Furthermore, a surge event can be selectively predicted by the one or more computer processors based at least partially on the analysis of the compressor efficiency.

In certain embodiments of the disclosure, a method is provided. The method can include receiving a plurality of performance parameters of a compressor by one or more computer processors associated with a turbomachine. Furthermore, the method can include analyzing the plurality of performance parameters to determine corrected performance values of the plurality of performance parameters. Based, at least partially on the corrected performance values, a compressor efficiency can be determined. The example method can further include standardizing the compressor efficiency for a standard mode of operation. Historical performance data associated with the standard mode of operation can be ascertained to analyze the compressor efficiency based, at least partially, on the historical performance data. Furthermore, a surge event can be selectively predicted based at least partially on the analysis of the compressor efficiency.

In yet further embodiments of the disclosure, a system is provided. The system can include at least one turbomachine including a compressor, a controller in communication with the at least one turbomachine and operable to receive a plurality of performance parameters of the compressor. The system can also include one or more computer processors. The one or more computer processors can be operable to receive the plurality of performance parameters of the compressor from the controller. Additionally, the one or more computer processors can be operable to analyze the plurality of performance parameters to determine corrected performance values of the plurality of performance parameters. Based, at least partially, on the corrected performance values, the one or more computer processors can determine a compressor efficiency. The one or more computer processors can be also operable to standardize the compressor efficiency for a standard mode of operation. The historical performance data associated with the standard mode of operation can be ascertained and the one or more computer processors operable to analyze the compressor efficiency based at least partially on the historical performance data and selectively predict, based at least partially on the analysis of the compressor efficiency, a surge event.

Other embodiments and aspects will become apparent from the following description taken in conjunction with the following drawings.

DETAILED DESCRIPTION

Figure 1:
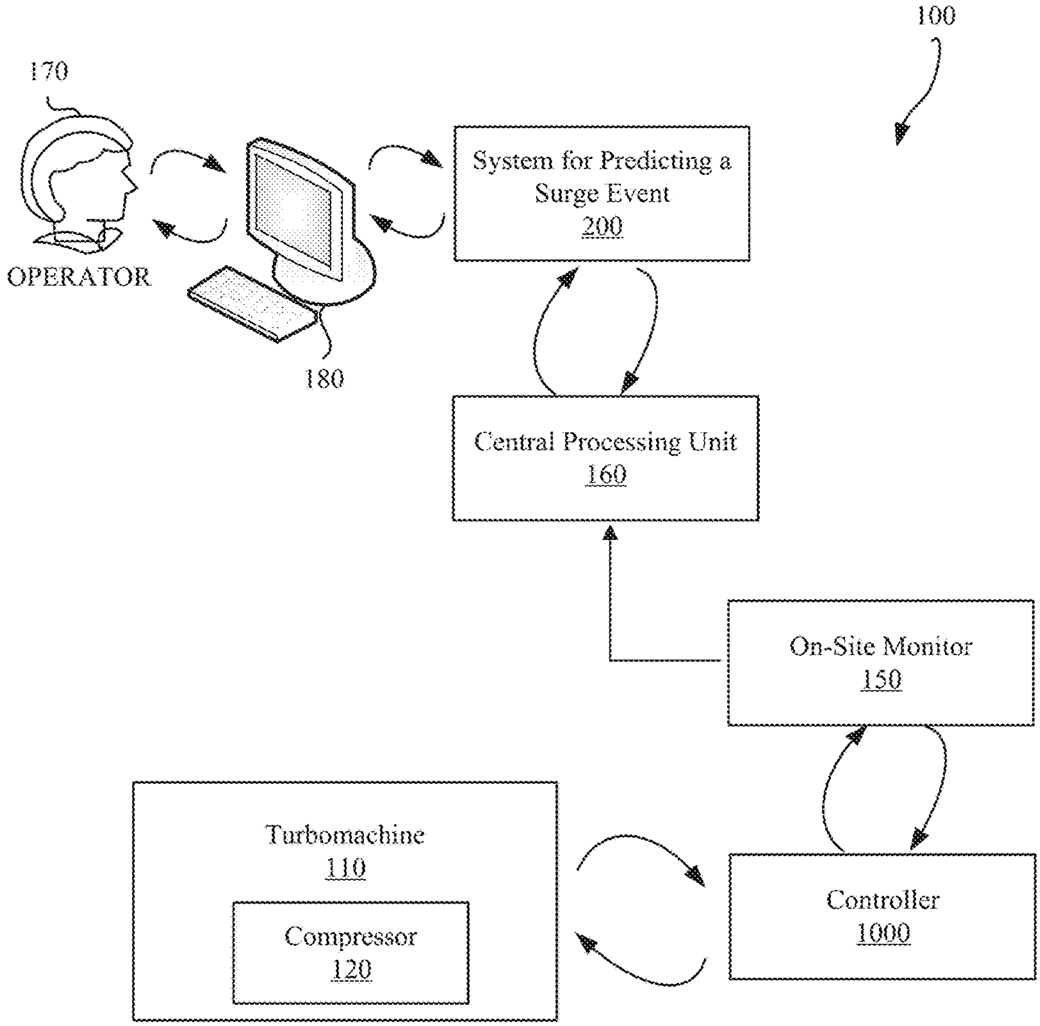
FIG. 1 is a block diagram illustrating an example environment and system for predicting a surge event in a compressor of a turbomachine in accordance with an embodiment of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments described herein relate to methods and systems for predicting a surge event in a compressor of a turbomachine. Specifically, an example method can utilize an existing framework and sensors associated with the turbomachine, combined with machine learning techniques, to predict when a surge event of a compressor is likely to occur. Understanding effects of grid fluctuations on surge events can allow efficiently determining of surge event risks before the occurrence of an instability in a compressor of the turbomachine. Additionally, the methods described herein allow monitoring multiple turbomachines while using existing hardware, software, and monitoring processes. Moreover, the methods described herein are sufficiently general to be applied to multiple turbomachines without customization.

This disclosure is directed to real-time monitoring of surge events occurring in compressors of a plurality of turbomachines. In various example embodiments, a plurality of performance parameters of the compressors can be collected and analyzed in real-time to determine corrected performance values of the performance parameters. The corrected performance values can be used to calculate the compressor efficiency based on fired hours of operation. The compressor efficiency can be standardized for a standard mode of operation and compared with the established efficiency from historical events. Additionally, the corrected values of performance parameters can be processed using a machine learning model to determine a surge risk score using historical surge events. Furthermore, the compressor efficiency can be compared to a threshold compressor efficiency established for a grid stability of a region associated with the compressor. Based on the determined surge risk score, degradation level, and compressor efficiency exceeding thresholds, a probability of a surge event in the compressor during a predefined period (e.g., in the near future) can be predicted, and the predicted surge event reported to an operator.

The technical effects of certain embodiments of the disclosure can include ensuring stable operation of a turbomachine and avoiding performance decrease and damage associated with surge events. Further technical effects of certain embodiments of the disclosure can include an ability to monitor surge events on a fleet of turbomachine in real time using existing hardware, software, and monitoring processes. Additionally, technical effects of certain embodiments of the disclosure may include financial benefits resulting from applying potential safe scenarios based on risk categorization created to avoid a potential surge event. The following provides the detailed description of various example embodiments related to systems and methods for predicting a surge event in a compressor of a turbomachine.

Referring now to FIG. 1, a block diagram illustrates an example system environment 100 suitable for implementing systems and methods for predicting a surge event in a compressor of a turbomachine, in accordance with certain embodiments of the disclosure. Various flow instabilities can occur while operating a turbomachine 110, for example, a surge event in a compressor 120 of the turbomachine 110. The turbomachine 110 may be part of a fleet of a power plant and may include a gas turbine. The operation of the turbomachine 110 may be managed through a controller 1000. The controller (or a plurality of controllers) 1000 may interact with a system 200 for predicting a surge event, an on-site monitor 150, and/or a central processing unit. Performance parameters of the turbomachine 110 as well as performance parameters of other turbomachines in the fleet may be acquired by the controller 1000 or a data acquisition system (not shown). The performance parameters may include a mass flow, a compressor efficiency, a compressor extract flow, a compressor discharge temperature, a compressor discharge pressure, a compressor inlet temperature, a compressor inlet pressure drop, a mean exhaust temperature, a compressor discharge pressure, a compressor inlet pressure drop, and so forth. The performance parameters may be collected and stored by the on-site monitor 150.

The performance parameters can be analyzed to determine corrected performance values of the performance parameters. The analysis can be performed by the on-site monitor 150, or alternatively, the performance parameters can be transmitted for analysis to a central processing unit 160. The system 200 for predicting a surge event can use the performance parameters to determine corrected performance values of the performance parameters and calculate a rate of degradation of the compressor 120 for the corrected compressor efficiency based on fired hours of operation for data points for a standard mode of operation. The compressor efficiency can be compared with the established rate of degradation from the historical events to predict a risk of occurrence of a surge event in the compressor 120 within a predefined period of time. The predicted surge event can be reported to an operator 170 via a client device 180. Additionally, a risk associated with the surge event can be categorized and a recommendation conforming to the category of the risk provided to the operator 170. The recommendation can include modifying turbine operations, activating an inlet bleed heat mode, performing a water wash of the compressor 120, improving filtration, performing inlet conditioning, and so forth.

Figure 2:
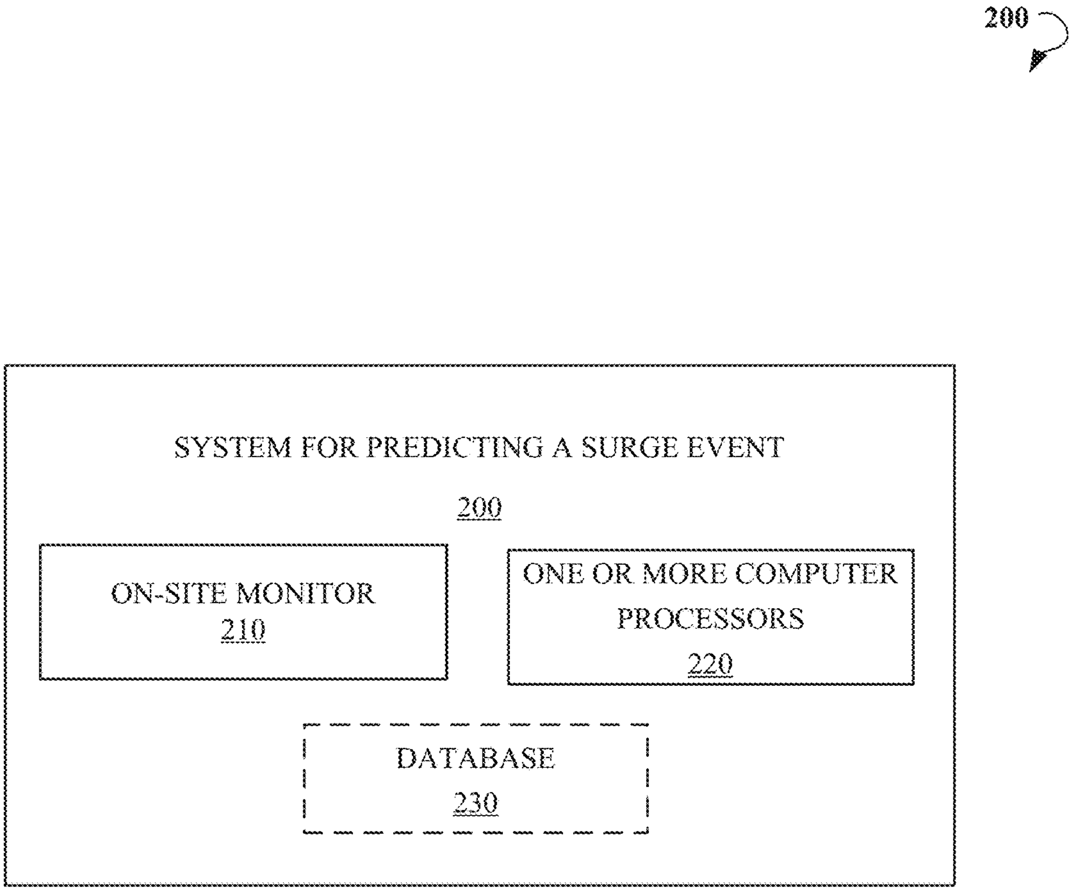
FIG. 2 is a block diagram showing various modules of an example system for predicting a surge event, in accordance with certain embodiments of the disclosure.

FIG. 2 is a block diagram showing various example modules of the system 200 for predicting a surge event, in accordance with certain embodiments of the disclosure. The system for predicting a surge event 200 may comprise an on-site monitor 210, one or more computer processors 220, and an optional database 230. The on-site monitor 210 may communicate with a controller of the turbomachine or a data acquisition system. The on-site monitor 210 can monitor and collect performance parameters of the turbomachine and send the performance parameters to the one or more computer processors 220. The one or more computer processors 220 can be part of the on-site monitor 210, a central processing unit, or another external device.

The one or more computer processors 220 can include a programmable processor, such as a microcontroller, a central processing unit, and so forth. In other embodiments, the one or more computer processors 220 can include an application-specific integrated circuit or a programmable logic array, such as a field programmable gate array, designed to implement the functions performed by the system for predicting a surge event 200.

In various embodiments, the system for predicting a surge event 200 may be deployed on the on-site monitor 210 associated with the turbomachine or on the central processing unit. Alternatively, the system 200 for predicting a surge event may reside outside the on-site monitor 210 or the central processing unit and be provided remotely via a cloud-based computing environment. The database 230 can be operable to receive and store the performance parameters and/or historical data associated with surge events.

The one or more computer processors 220 can be operable to receive the performance parameters of the compressor of the turbomachine. The performance parameters can include a mass flow, a compressor efficiency, a compressor discharge temperature, a compressor extract flow and operational data such as a compressor inlet temperature, a discharge temperature, mean exhaust temperature, and so forth. The performance parameters can be analyzed to determine corrected performance values of the performance parameters. Using the corrected performance values, the one or more computer processors 220 can calculate a rate of degradation for a corrected compressor efficiency based on a range of fired hours of operation for specific data points. The compressor efficiency can be compared with the established rate of degradation associated with historical events. The one or more computer processors 220 can use the corrected values of the mass flow, compressor efficiency, compressor discharge temperature, compressor extract flow and operational data such as compressor inlet temperature, discharge temperature and mean exhaust temperature to calculate a surge risk score of the compressor based on a machine learning model established using historical surge events. In some embodiments of the disclosure, the machine learning model includes a cluster model. The machine learning model can be applied to classify the turbomachine with respect to a surge risk score based on the corrected performance values.

In some embodiments of the disclosure, the one or more computer processors 220 compare the value of compressor efficiency with static thresholds based on grid stability of the region where the compressor is located. The comparison results can be considered in predicting a surge event of the compressor. When the surge risk score falls within certain ranges associated with surge events, the one or more computer processors 220 can determine that there is a probability that the compressor may surge within a certain period in future and a predicted surge event can be reported to an operator. Based on classification of the surge event risk, recommendations can be issued and provided to the operator. The recommendations can include mitigating actions that can help preventing an occurrence of the surge event, for example, modifying turbine operation, activating an inlet bleed heat mode, performing a water wash, improving filtration, performing an inlet conditioning, and so forth.

Figure 3:
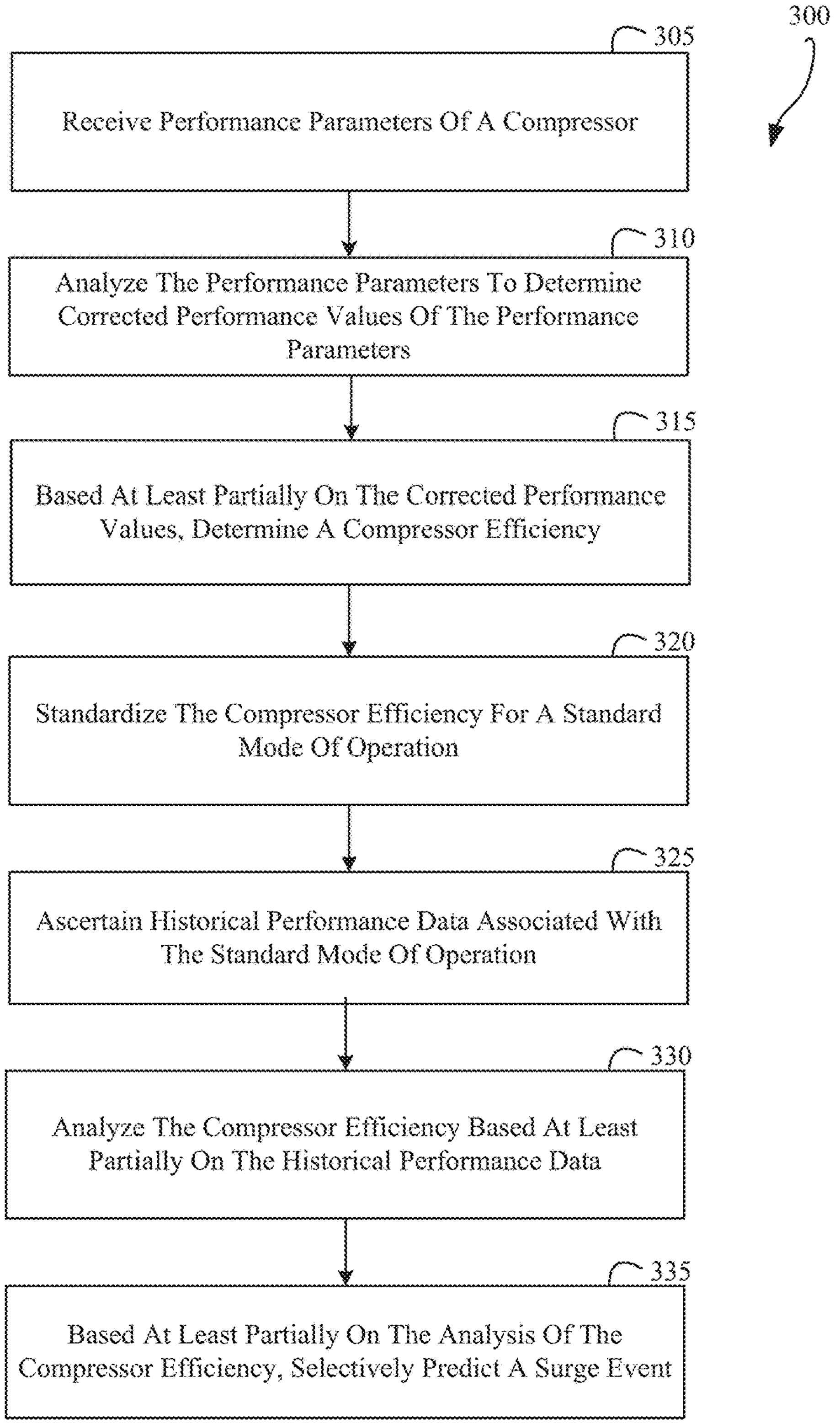
FIG. 3 is a process flow diagram illustrating an example method for predicting a surge event in a compressor of a turbomachine, in accordance with certain embodiments of the disclosure.

FIG. 3 depicts a process flow diagram illustrating an example method 300 for predicting a surge event in a compressor of a turbomachine, in accordance with certain embodiments of the disclosure. The method 300 may be performed by processing logic that may comprise hardware (e.g., dedicated logic, programmable logic, and microcode), software (such as software run on a general-purpose computer system or a dedicated machine), or a combination of both. In one example embodiment of the disclosure, the processing logic resides at the one or more computer processors 220 that can be part of the on-site monitor 150 or the central processing unit 160 shown in FIG. 1, which, in turn, can reside on a remote device or on a server, for example, in a cloud-based environment. The one or more computer processors 220 may comprise processing logic. It should be appreciated by one of ordinary skill in the art that instructions said to be executed by the on-site monitor 150 or the central processing unit 160 may, in fact, be retrieved and executed by one or more computer processors 220. The on-site monitor 150 or the central processing unit 160 can also include memory cards, servers, and/or computer disks. Although the on-site monitor 150 or the central processing unit 160 can be operable to perform one or more steps described herein, other control units may be utilized while still falling within the scope of various embodiments of the disclosure.

As shown in FIG. 3, the method 300 may commence at operation 305 with receiving performance parameters of a compressor. The performance parameters can be acquired by a controller or a data acquisition system associated with the turbomachine and collected from the controller or the data acquisition system by local computers at the turbomachine (i.e. on-site monitor). The performance parameters collected for prediction of a surge event can include a mass flow, a compressor efficiency, a compressor extract flow, a compressor discharge temperature, a compressor discharge pressure, a compressor inlet temperature, a compressor inlet pressure drop, a mean exhaust temperature, and so forth. At operation 310, the performance parameters can be analyzed to determine corrected performance values of the performance parameters. Additionally, data sanity and integrity can be performed based on a data quality check and/or an out of range check. If poor quality data or out of range data is detected, such data can be discarded. These checks can be important to minimize alarms that do not provide any value to downstream customers. Data quality can be poor for multiple reasons, such as broken data connection between controller and on-site monitor, misconfiguration of tags, and so forth. In addition, values associated with the collected data can be unreasonable. For instance, a compressor discharge pressure can drop to a real value of 0 while the turbine is online. This data can be filtered out and not considered in the downstream analysis.

Once the corrected performance values are determined and data integrity of the sensors is verified, the method can proceed at operation 315 with determining a compressor efficiency based on the corrected performance values. The compressor efficiency can be characterized by a rate of degradation of the compressor efficiency based on fired hours operation at baseload.

At operation 320, the compressor efficiency can be standardized for a standard mode of operation. Furthermore, it can be determined whether data points associated with the performance parameters are sufficient for analyzing the performance data. This check can be performed to ensure that all baseline values are being calculated at same standard operation mode. The standard operation mode can include a steady state part load mode or a base load mode.

At operation 325, historical performance data associated with the standard mode of operation can be ascertained. The historical performance data can include data concerning historical surge events. This data can used to construct a machine learning model which can be applied to calculate a surge risk score of the compressor based on the corrected performance values and to classify the turbomachine with respect to the surge risk score.

The compressor efficiency can be analyzed based on the historical performance data at operation 330. The analysis may include determining whether the rate of degradation of the compressor efficiency is greater than thresholds established based on the historical performance data. Furthermore, the analysis may be used to determine whether the surge risk score is equal or greater than the surge risk score of historical events. Additionally, it can be determined whether the value of the compressor efficiency is less than a threshold compressor efficiency established for a grid stability of a region associated with the compressor.

Based on the analysis of the compressor efficiency, a surge event can be selectively predicted at operation 335. Specifically, if any of the described components of the analysis is true, it can be determined that the probability of the compressor surge within a certain future period exceeds a predetermined level. The predicted surge event can be then reported to an operator, for example, by providing an alarm through visual and/or audio means, sending notifications, and so forth. Furthermore, the surge event risk can be assigned a category and one or more recommendations concerning risk mitigation corresponding to the category can be issued and provided to the operator.

The described method can be distributed and implemented by a plurality of turbomachines across the world using the on-site monitor without installing special hardware/software. In addition, this method can be executed within a cloud-based environment.

Figure 4:
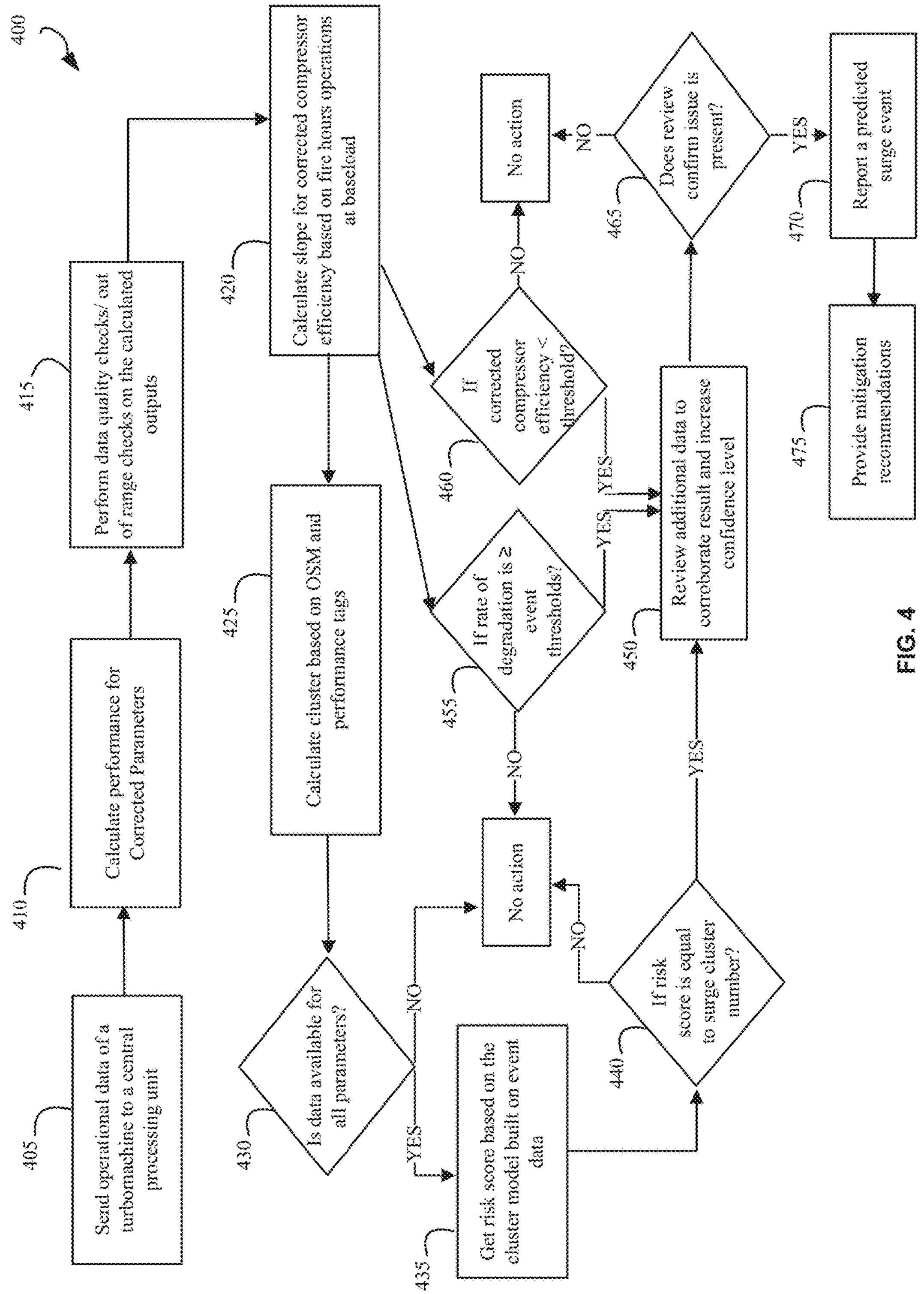
FIG. 4 is a process flow diagram illustrating an example method for predicting a surge event in a compressor of a turbomachine, in accordance with certain embodiments of the disclosure.

FIG. 4 depicts a process flow diagram illustrating an example method 400 for predicting a surge event in a compressor of a turbomachine, in accordance with certain embodiments of the disclosure. At an optional operation 405, an on-site monitor can send operational data associated with a turbomachine to a central processing unit. The operational data can include performance parameters of a combustor of the turbomachine, for example, performance parameters including at least one of the following: a mass flow, a compressor efficiency, a compressor extract flow, a compressor discharge temperature, a compressor discharge pressure, a compressor inlet temperature, a compressor inlet pressure drop, a mean exhaust temperature, and so forth. At operation 410, corrected values for various performance parameters can be calculated. At operation 415, data quality and out-of-range sensor checks can be performed for the calculated outputs of the performance parameters. Based on the checks, prediction reliability can be raised and the number of false alarms can be minimized.

At operation 420, a slope for compressor efficiency can be calculated for a rolling window of the fired hours of operation at a steady state part load mode or a base load mode. At operation 425, a cluster model can be calculated based on historical data collected from the on-site monitor and performance tags. Although in the example embodiment illustrated by FIG. 4, the calculation is performed using a cluster model, other models and machine learning techniques can be used to perform the calculation. At operation 430, availability of data for all parameters can be checked to determine whether data points associated with the performance parameters are sufficient for analyzing the performance data. If the data is available for all parameters, a risk score can be determined using the cluster model built using historical surge event data at operation 435. No action is taken if the data for all parameters is not available.

Based on the data obtained in operations 405-435, an analysis is performed to determine a probability of a surge event. The risk score calculated at operation 435 can be compared to a surge cluster number at operation 440. Furthermore, at operation 455, the identified value of the compressor efficiency is analyzed to determine whether the rate of degradation of the compressor efficiency exceeds thresholds established for the historical performance data. At operation 460, the method 400 can proceed to determine whether the corrected compressor efficiency is greater than static thresholds. In case of a positive answer to any of the analysis components 440, 455, or 460, a review of additional data can be requested to corroborate result and increase the confidence level of the prediction. The review can be made by the personnel of the turbomachine or a fleet of turbomachines (a product services and/or operations team). For the review, the data indicating that a surge risk is present can be visually provided and emphasized (e.g., highlighted) for presentation to the personnel. Thereafter, the personnel can analyze additional information, such as the last offline water wash date, historical performance alarms, grid stability of that region, and so forth. The results of the review can be received from the personnel. At operation 465, it can be determined whether the review confirms the existence of an issue. If the existence of the issue is confirmed, a predicted surge event is reported at operation 470. Additionally, mitigation recommendations can be provided at operation 475.

Figure 5:
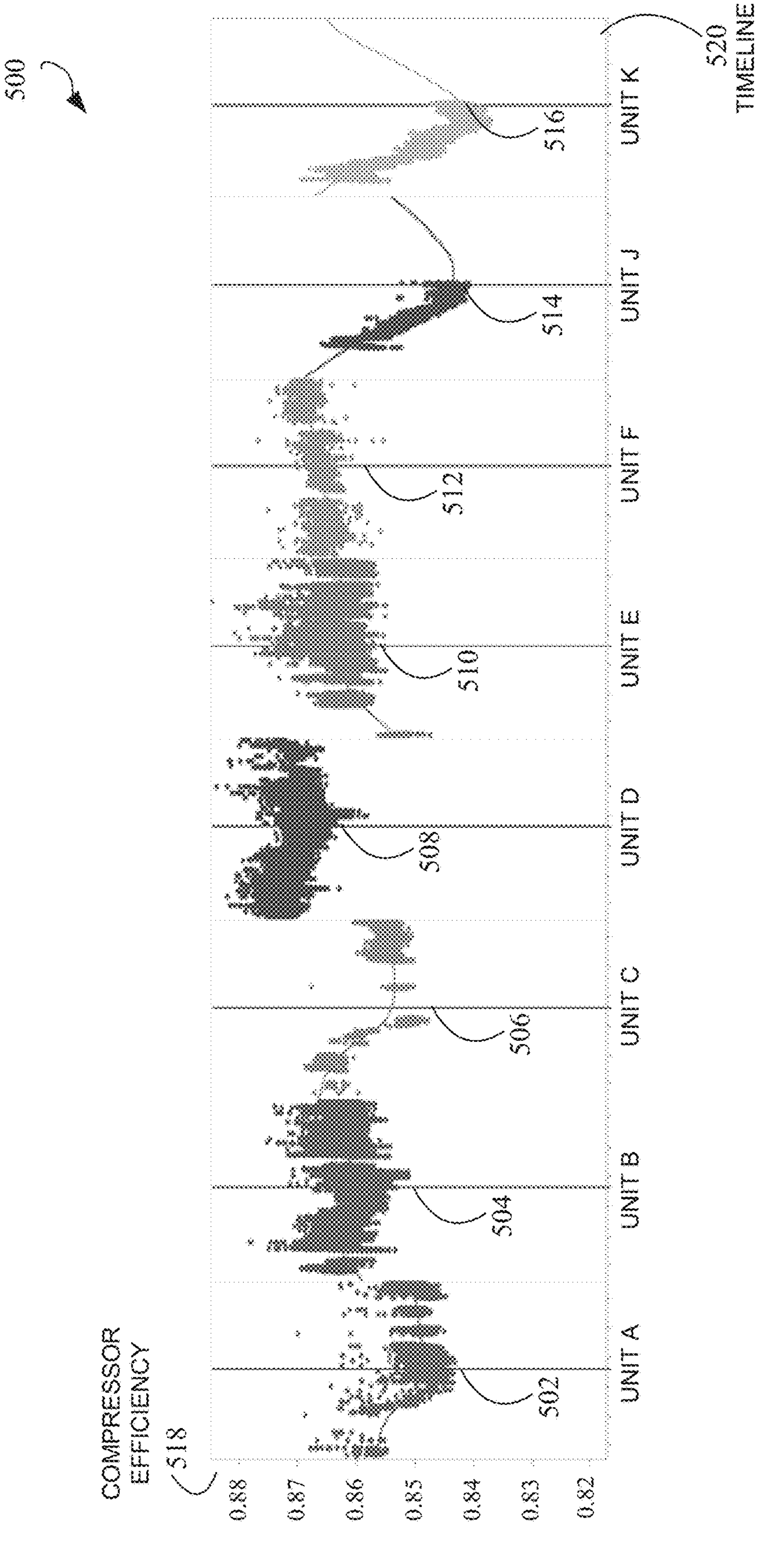
FIG. 5 is a plot illustrating example changes in a compressor efficiency over time over a range of units associated with the same location and electric grid, in accordance with certain embodiments of the disclosure.

FIG. 5 is a plot 500 illustrating example changes in compressor efficiency over time for a range of turbomachine units, in accordance with one or more example embodiments of the disclosure. The plot 500 shows compressor efficiency 518 against a timeline 520 for eight turbomachines located within the same grid, shown as units A-K. The data points for each of the units A-K illustrate changes in the compressor efficiency 518 with time before and after surge events experienced by unit J and unit K. The times of occurrence of the surge events are marked by lines 502-516.

Figure 6:
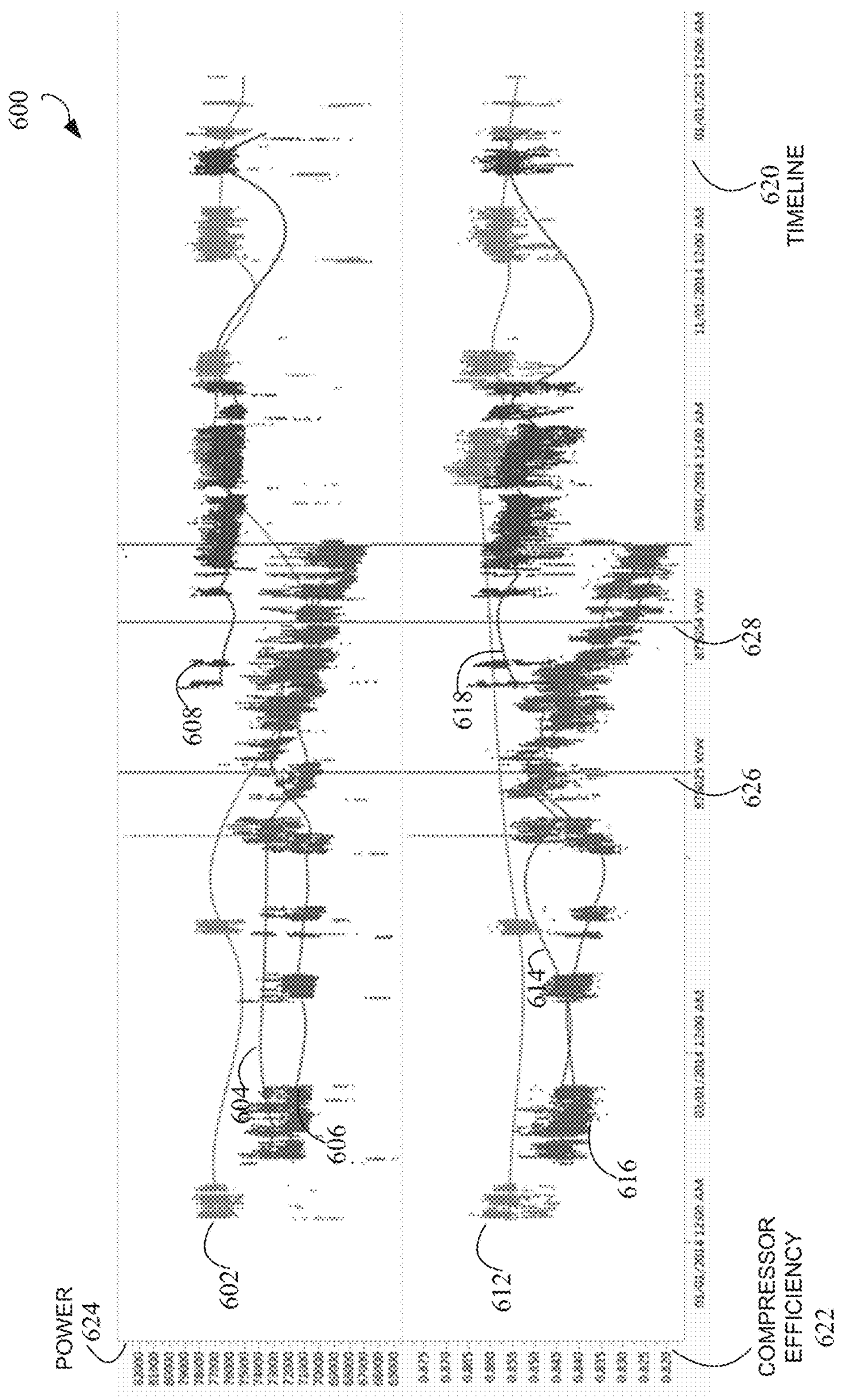
FIG. 6 is a plot illustrating example changes in compressor efficiency over time in comparison to changes in power against time for a range of units in different locations, in accordance with certain embodiments of the disclosure.

FIG. 6 is a plot 600 illustrating example changes in compressor efficiency over time as compared to changes of power against time, in accordance with certain example embodiments of the disclosure. The plot 600 shows changes in power 624 against timeline 620 for five units demonstrated by signatures 602-608. These five units are associated with an alternative location. Compressor efficiency 622 against timeline 620 is illustrated for the same units by signatures 612-618. Surge events experienced in the location of the illustrated five units are marked by line 626 and line 628.

Data illustrated by FIG. 5 and FIG. 6 can be used to build a machine learning model, such as, for example, a cluster model. Data points indicative of a compressor efficiency, for example, a mass flow, a compressor efficiency, a compressor extract flow, a compressor discharge temperature, a compressor discharge pressure, a compressor inlet temperature, a compressor inlet pressure drop, a mean exhaust temperature, and so forth, such as illustrated in FIG. 5 and FIG. 6, can be partitioned into groups (clusters) based on their similarity. Using the cluster model, clusters for both types of units of FIG. 5 and FIG. 6 can be found.

Figure 7:
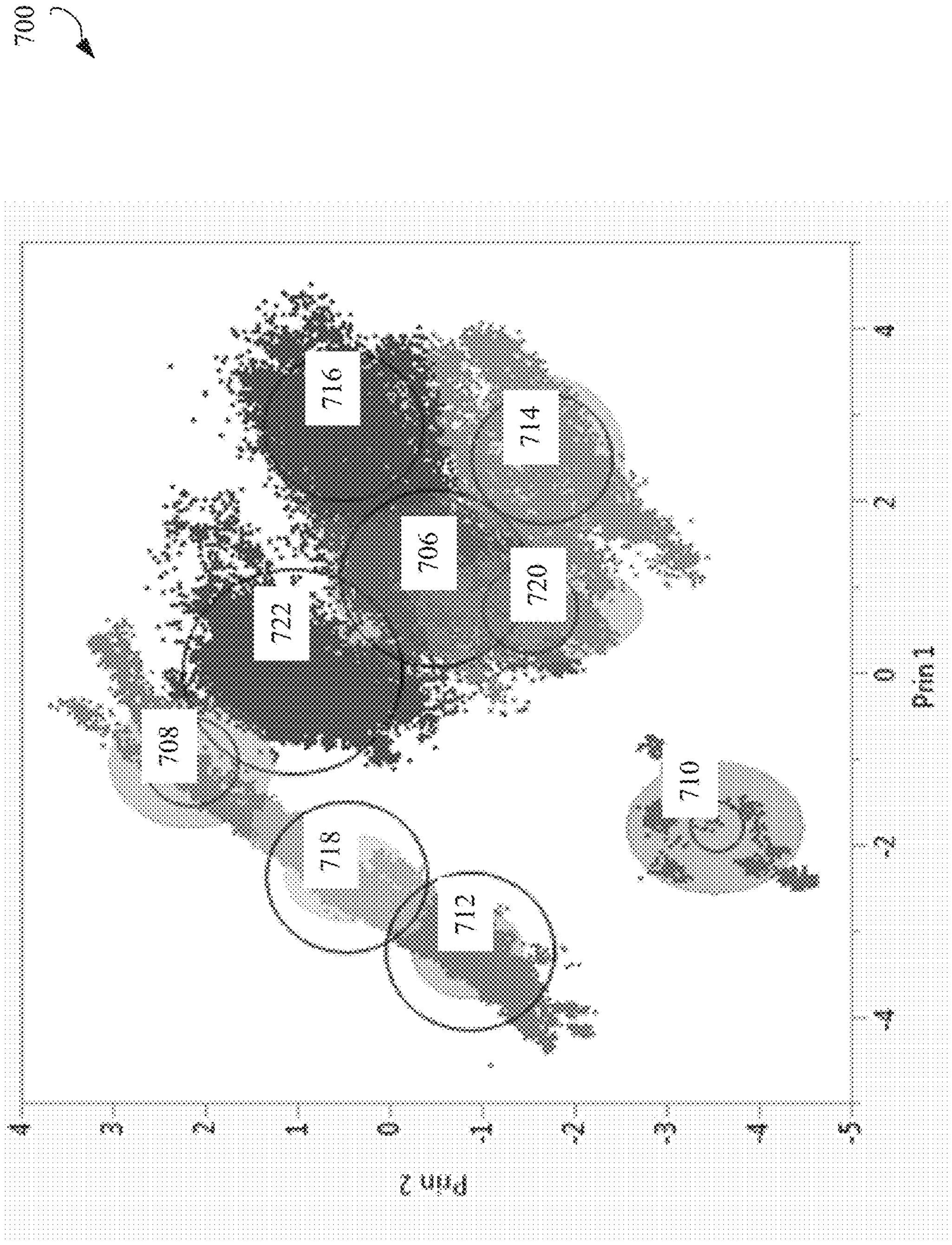
FIG. 7 is a representation showing example clusters identified by cluster analysis, in accordance with certain embodiments of the disclosure.

FIG. 7 is a representation 700 illustrating example clusters identified by cluster analysis for units of FIG. 5 and FIG. 6, in accordance with one or more example embodiments of the disclosure. Based on available data, clusters 708-722 can be identified. Data points of units of FIG. 5 and FIG. 6 can be analyzed against the identified clusters.

Figure 8:
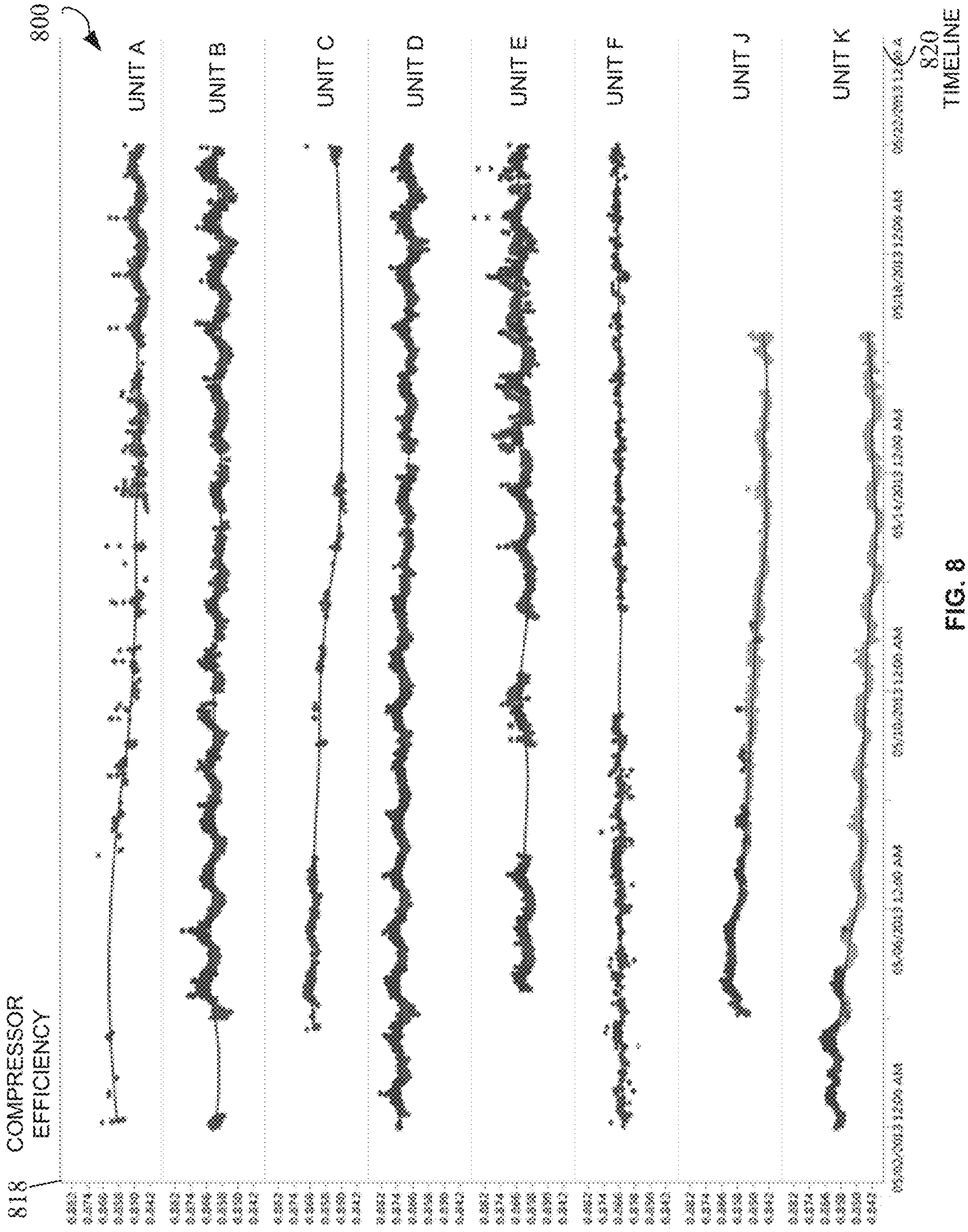
FIG. 8 is a representation showing example data points identified in relation to clusters, in accordance with certain embodiments of the disclosure.

FIG. 8 is a representation 800 showing example data points for units A-K identified in relation to clusters. The data points can demonstrate compressor efficiency 818 of the units A-K against a timeline 820. The analysis performed against clusters can show that surge events of unit J and unit K fall in cluster 714 (see FIG. 7). Other units that have not experienced a surge event can be associated with clusters 706 and 716. Therefore, compressor parameters falling within cluster 714 for units in location of the units A-K can be predictive of a surge event.

Figure 9:
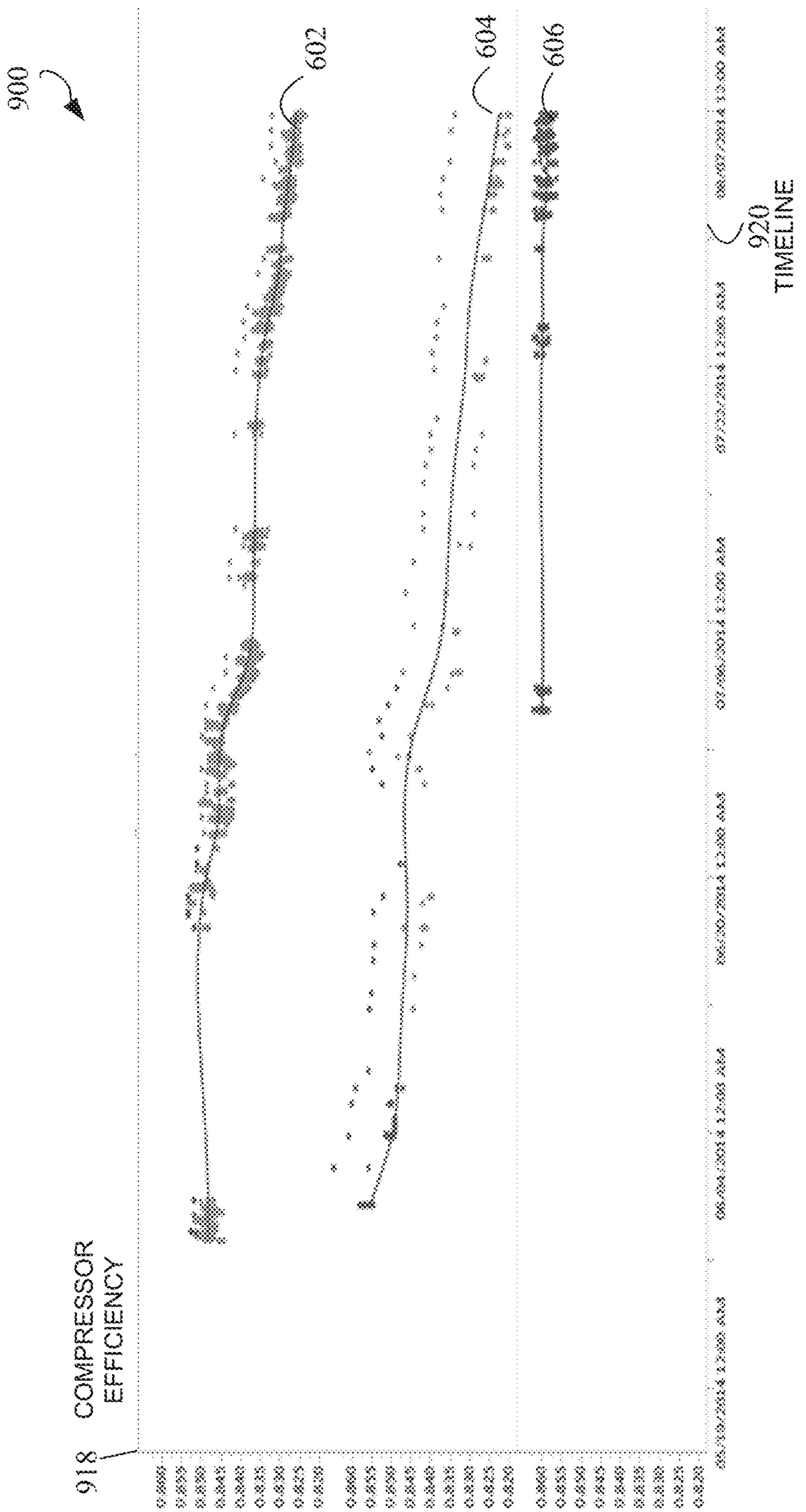
FIG. 9 is a representation showing example data points identified in relation to clusters, in accordance with certain embodiments of the disclosure.

FIG. 9 is a representation 900 showing example data points for units 602-606 identified in relation to clusters. The data points can demonstrate compressor efficiency 918 of the units 602-606 against a timeline 920. The analysis of the clusters can show that surge events of unit 604 and unit 606 fall in cluster 720 (see FIG. 7). Unit 602 has not experienced a surge event and is associated with cluster 714 (see FIG. 7). Therefore, compressor parameters falling within cluster 720 for units in location of the units 602-606 can be used to predict a surge event.

Thus, further data associated with combustor parameters of a turbomachine can be used to calculate a risk score using the cluster model illustrated by FIG. 7 and determine whether a risk score of a combustor is equal to a surge cluster number. Based on the risk score, a determination of a probability of a surge event to occur in the combustor within a certain period of time can be made. The determination based on the risk score can be analyzed along with other factors associated with surge events.

Figure 10:
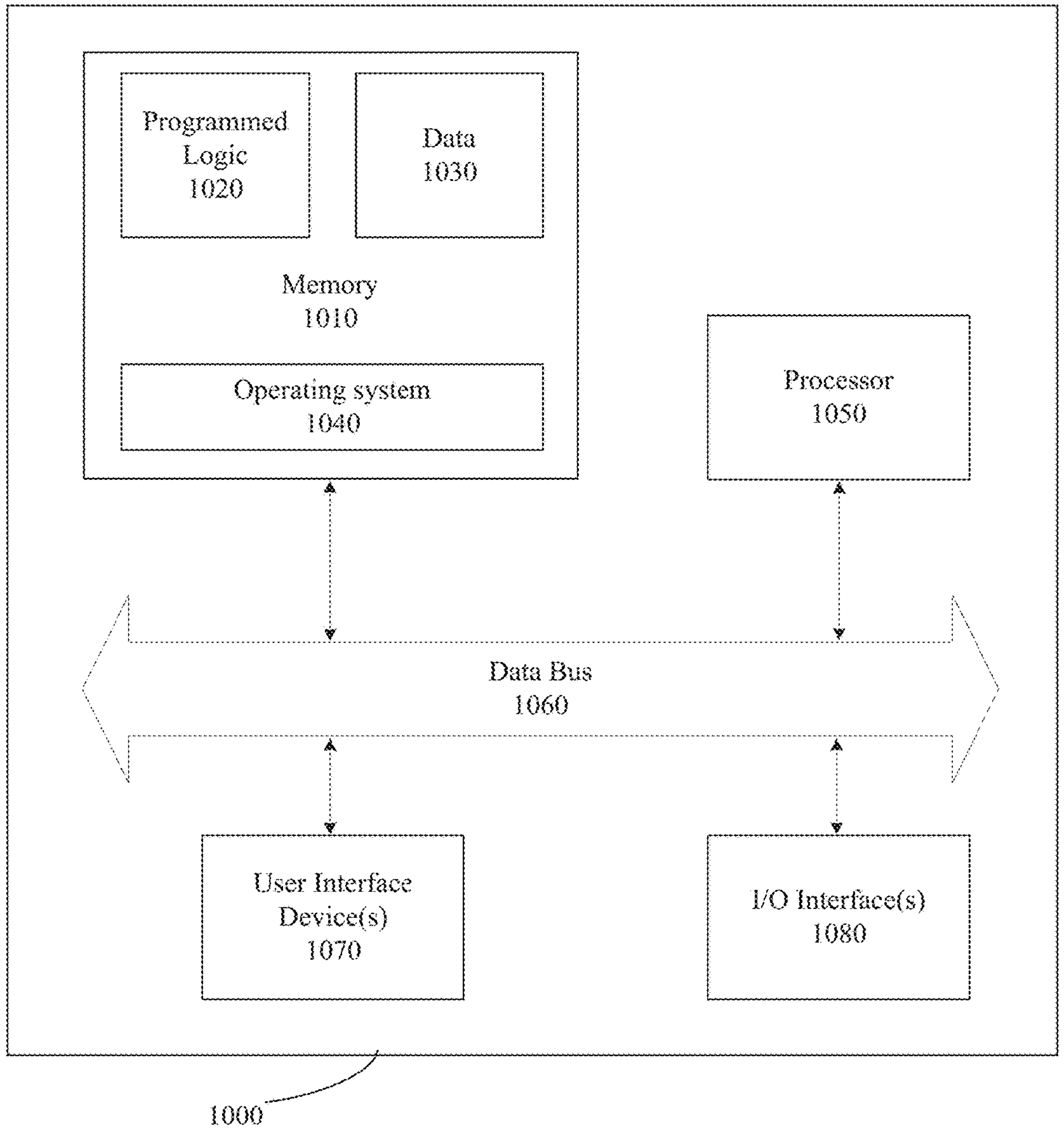
FIG. 10 is a block diagram illustrating an example controller for controlling a turbomachine, in accordance with certain embodiments of the disclosure.

FIG. 10 depicts a block diagram illustrating an example controller 1000 for predicting a surge event in a compressor of a turbomachine, in accordance with an embodiment of the disclosure. More specifically, the elements of the controller 1000 may be used to acquire operational data of a turbomachine and control operation of the turbomachine to introduce mitigation actions when a surge event is predicted. The controller 1000 may include a memory 1010 that stores programmed logic 1020 (e.g., software) and may store data 1030, such as the performance parameters of the compressor of the turbomachine, specifically, a mass flow, a compressor efficiency, a compressor extract flow, a compressor discharge temperature, a compressor discharge pressure, a compressor inlet temperature, a compressor inlet pressure drop, a mean exhaust temperature, and so forth. The memory 1010 also may include an operating system 1040.

A processor 1050 may utilize the operating system 1040 to execute the programmed logic 1020, and in doing so, may also utilize the data 1030. A data bus 1060 may provide communication between the memory 1010 and the processor 1050. Users may interface with the controller 1000 via at least one user interface device 1070, such as a keyboard, mouse, control panel, or any other devices capable of communicating data to and from the controller 1000. The controller 1000 may be in communication with the turbomachine online while operating, as well as in communication with the turbomachine offline while not operating, via an input/output (I/O) interface 1080. More specifically, one or more of the controllers 1000 may take part in collection of operational data of the turbomachine, such as, but not limited to, receive operational data associated with a compressor of the turbomachine, transmit the operational data to an on-site monitor, receive a notification of a predicted surge event, report the predicted surge event, implement a mitigation action associated with the predicted surge event based on a command of an operator. Additionally, it should be appreciated that other external devices or multiple other turbomachines may be in communication with the controller 1000 via the i/o interface 1080. In the illustrated embodiment, the controller 1000 may be located remotely with respect to the turbomachine; however, it may be co-located or even integrated with the turbomachine. Further, the controller 1000 and the programmed logic 1020 implemented thereby may include software, hardware, firmware, or any combination thereof. It should also be appreciated that multiple controllers 1000 may be used, whereby different features described herein may be executed on one or more different controllers.

Accordingly, certain embodiments described herein can allow for real-time monitoring process of surge events occurring within the compressor of a turbomachine, such as, for example, a gas turbine, on a plurality of turbomachines. The prediction of surge events may be accomplished through the use of machine learning models based on historical surge events. Additionally, rate of degradation of the compressor as well as compressor efficiency compared with the static thresholds based on grid stability of the region where the compressor is present can be considered in prediction of a surge event. By using the on-site monitor and existing hardware/software/signals, the method for predicting a surge event in a compressor of a turbomachine can be applied to multiple turbomachines to provide monitoring without customization. Additionally, the method can be executed in a cloud-based environment performing the same processing.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for predicting a surge event in a compressor of a turbomachine, the method comprising:
- receiving, by one or more computer processors associated with a turbomachine, a plurality of performance parameters of a compressor;
- analyzing, by one or more computer processors, the plurality of performance parameters to determine corrected performance values of the plurality of performance parameters;
- based at least partially on the corrected performance values, determining, by one or more computer processors, a compressor efficiency;
- standardizing, by one or more computer processors, the compressor efficiency for a standard mode of operation;
- ascertaining, by one or more computer processors, historical performance data associated with the standard mode of operation;
- analyzing, by one or more computer processors, the compressor efficiency based at least partially on the historical performance data; and
- based at least partially on the analysis of the compressor efficiency, selectively predicting, by one or more computer processors, a surge event.

2. The method of claim 1, wherein the analyzing of the compressor efficiency includes:
- constructing a machine learning model based at least partially on historical surge events; and
- using the machine learning model to classify the turbomachine with respect to a surge risk score based on the corrected performance values.

3. The method of claim 1, wherein the analyzing of the compressor efficiency includes comparing the compressor efficiency to a threshold compressor efficiency established for a grid stability of a region associated with the compressor.

4. The method of claim 1, wherein the compressor efficiency is further based at least partially on a range of fired hours associated with the compressor.

5. The method of claim 1, wherein the standard mode of operation includes a steady state part load mode and a base load mode.

6. The method of claim 1, wherein the performance parameters include at least one of the following: a mass flow, a compressor efficiency, a compressor extract flow, a compressor discharge temperature, a compressor discharge pressure, a compressor inlet temperature, a compressor inlet pressure drop, and a mean exhaust temperature.

7. The method of claim 1, wherein the plurality of performance parameters of the compressor is provided by a controller associated with the turbomachine or a data acquisition system.

8. The method of claim 1, wherein the determining of the compressor efficiency includes determining that data points associated with the performance parameters are sufficient for analyzing performance of the compressor.

9. The method of claim 1, wherein the determining of the corrected performance values of the performance parameters includes:
- performing one or more of the following: a data quality check and an out of range check associated with data related to the corrected performance values;
- determining that quality of the data is poor or that the data is out of range; and
- based on the determination, selectively discarding poor quality data and out of range data.

10. The method of claim 1, wherein the analyzing of the compressor efficiency includes determining that a rate of degradation of the compressor efficiency is greater than thresholds established for the historical performance data.

11. The method of claim 1, further comprising reporting the predicted surge event to an operator.

12. The method of claim 1, further comprising:
- categorizing a risk associated with the surge event; and
- issuing a recommendation based on a category of the risk.

13. The method of claim 12, wherein the recommendation includes at least one of the following: modifying turbine operation, activating an inlet bleed heat mode, performing a water wash, improving filtration, and performing an inlet conditioning.

14. A system for predicting a surge event in a compressor of a turbomachine, the system comprising:
- one or more computer processors associated with a turbomachine and operable to:
  - receive a plurality of performance parameters of a compressor;
  - analyze the plurality of performance parameters to determine corrected performance values of the performance parameters;
  - based at least partially on the corrected performance values, determine a compressor efficiency;
  - standardize the compressor efficiency for a standard mode of operation;
  - ascertain historical performance data associated with the standard mode of operation;
  - analyze the compressor efficiency based at least partially on the historical performance data; and
  - based at least partially on the analysis of the compressor efficiency, selectively predict a surge event.

15. The system of claim 14, wherein the plurality of performance parameters of the compressor is provided by a data acquisition system or a controller associated with the turbomachine.

16. The system of claim 14, further comprising an on-site monitor associated with the turbomachine and operable to collect the plurality of performance parameters of the compressor.

17. The system of claim 14, wherein the compressor efficiency is further based at least partially on a range of fired hours associated with the compressor.

18. The system of claim 14, wherein the performance parameters include at least one of the following: a mass flow, a compressor efficiency, a compressor extract flow, a compressor discharge temperature, a compressor discharge pressure, a compressor inlet temperature, a compressor inlet pressure drop, and a mean exhaust temperature.

19. The system of claim 14, wherein the one or more computer processors are associated with a central processing unit of the turbomachine.

20. A system comprising:

at least one turbomachine including a compressor;

a controller in communication with the at least one turbomachine and operable to receive a plurality of performance parameters of the compressor;

one or more computer processors operable to:

receive the plurality of performance parameters of the compressor;

analyze the plurality of performance parameters to determine corrected performance values of the performance parameters;

based at least partially on the corrected performance values, determine a compressor efficiency;

standardize the compressor efficiency for a standard mode of operation;

ascertain historical performance data associated with the standard mode of operation;

analyze the compressor efficiency based at least partially on the historical performance data; and based at least partially on the analysis of the compressor efficiency, selectively predict a surge event.

* * * * *